(12) United States Patent
Zhang et al.

(10) Patent No.: US 12,500,300 B2
(45) Date of Patent: Dec. 16, 2025

(54) SEALING ASSEMBLY AND BATTERY

(71) Applicant: EVE POWER CO., LTD., Hubei (CN)

(72) Inventors: Lei Zhang, Hubei (CN); He Zhao, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 552 days.

(21) Appl. No.: 18/002,856

(22) PCT Filed: Oct. 12, 2022

(86) PCT No.: PCT/CN2022/124893
§ 371 (c)(1),
(2) Date: Dec. 21, 2022

(87) PCT Pub. No.: WO2024/021313
PCT Pub. Date: Feb. 1, 2024

(65) Prior Publication Data
US 2024/0243454 A1 Jul. 18, 2024

(30) Foreign Application Priority Data
Jul. 28, 2022 (CN) .......................... 202221968740.0

(51) Int. Cl.
*H01M 50/186* (2021.01)
*H01M 10/04* (2006.01)
(Continued)

(52) U.S. Cl.
CPC ..... *H01M 50/186* (2021.01); *H01M 10/0422* (2013.01); *H01M 50/107* (2021.01);
(Continued)

(58) Field of Classification Search
CPC ............. H01M 50/186; H01M 50/107; H01M 50/152; H01M 50/184; H01M 50/636;
(Continued)

(56) References Cited

U.S. PATENT DOCUMENTS

2020/0303713 A1\* 9/2020 Lee ..................... H01M 50/533

FOREIGN PATENT DOCUMENTS

| CN | 207818752 U | 9/2018 |
|---|---|---|
| CN | 108847459 A | 11/2018 |

(Continued)

OTHER PUBLICATIONS

International Search Report in International application No. PCT/CN2022/124893, mailed on Apr. 2, 2023.
(Continued)

*Primary Examiner* — Eugenia Wang
(74) *Attorney, Agent, or Firm* — PV IP PC; Wei Te Chung; Christopher S. Ruprecht

(57) ABSTRACT

The present application provides a sealing assembly, including a sealing element and a top cover. The sealing element includes a connection portion and a sealing portion axially connected to each other. The connection portion is disposed protruding from the sealing portion along a radial direction. The top cover is provided with a first groove, a liquid injection hole is provided at a bottom of the first groove, and a ring riveting portion is disposed protruding from a periphery of the first groove. The sealing portion is inserted into the liquid injection hole in an interference fit, and the ring riveting portion is riveted to the connection portion, so that the ring riveting portion is annularly pressed on a top surface of the connection portion. The present application further provides a battery.

20 Claims, 2 Drawing Sheets

(51) Int. Cl.
    *H01M 50/107*    (2021.01)
    *H01M 50/152*    (2021.01)
    *H01M 50/184*    (2021.01)
    *H01M 50/636*    (2021.01)
    *H01M 50/645*    (2021.01)

(52) U.S. Cl.
    CPC ....... *H01M 50/152* (2021.01); *H01M 50/184* (2021.01); *H01M 50/636* (2021.01); *H01M 50/645* (2021.01)

(58) Field of Classification Search
    CPC ............. H01M 50/645; H01M 50/191; H01M 50/188; H01M 50/193; H01M 10/0422; Y02E 60/10
    See application file for complete search history.

(56) References Cited

FOREIGN PATENT DOCUMENTS

| | | |
|---|---|---|
| CN | 209675395 U | 11/2019 |
| CN | 214411464 U | 10/2021 |
| CN | 217009358 U | 7/2022 |

OTHER PUBLICATIONS

Written Opinion of the International Search Authority in International application No. PCT/CN2022/124893, mailed on Apr. 2, 2023.

\* cited by examiner

SEALING ASSEMBLY AND BATTERY

CROSS-REFERENCE TO RELATED APPLICATION

This application is a national stage of International Application No. PCT/CN2022/124893, filed on Oct. 12, 2022, which claims priority to Chinese Patent Application No. 202221968740.0, filed on Jul. 28, 2022. The aforementioned application is herein incorporated by reference in its entirety.

TECHNICAL FIELD

The present application relates to the technical field of battery technologies, for example, to a sealing assembly and a battery.

BACKGROUND

Liquid injection holes of cover plates of cylindrical batteries are sealed with sealing glue particles and sealing nails. That is, a first sealing is performed for the liquid injection holes with the sealing glue particles, and a second sealing is performed by welding the sealing nails in the liquid injection holes. Main defects of the above-mentioned structure are as following:
1, the above-mentioned process is complex and has higher cost;
2, since the sealing nails located on the cover plates are welded by laser, a problem of electrolyte volatilization exists at welding positions, which is easy to cause poor welding, resulting in degradation of a sealing performance.

Therefore, a sealing assembly and a battery are urgently needed to solve the above problems.

SUMMARY

The present application provides a sealing assembly, which can simplify a sealing process and ensure a sealing performance, and the sealing performance can be accurately judged in a sealing test.

In a first aspect, a sealing assembly is provided in embodiments of the present application, including:
a sealing element, the sealing element including a connection portion and a sealing portion axially connected to each other, where the connection portion is disposed protruding from the sealing portion along a radial direction; and
a top cover, the top cover being provided with a first groove, where a liquid injection hole is provided at a bottom of the first groove, a ring riveting portion is disposed protruding from a periphery of the first groove, the sealing portion is inserted into the liquid injection hole in an interference fit, and the ring riveting portion is riveted to the connection portion, so that the ring riveting portion is annularly pressed on a top surface of the connection portion.

In an embodiment, the top cover is further provided with a second groove, where the second groove is annularly defined at the periphery of the first groove at intervals, and the ring riveting portion is disposed between the first groove and the second groove.

In an embodiment, the connection portion includes a boss portion and an edge portion, where the edge portion is annularly disposed on a side surface of the boss portion, and the ring riveting portion is annularly pressed on the edge portion.

In an embodiment, the sealing assembly further includes a sealing ring, where the sealing ring is sleeved on the sealing portion and abutted against the bottom of the first groove.

In an embodiment, a side wall of the first groove is obliquely disposed before the ring riveting portion is riveted, so that a width of a notch of the first groove is greater than a width of the bottom of the first groove.

In an embodiment, the first groove is a circular groove, a diameter D1 of the notch of the first groove ranges from 3 mm to 10 mm, and a diameter D2 of the bottom of the first groove ranges from 2 mm to 9 mm.

In an embodiment, a depth H1 of the first groove ranges from 0.5 mm to 1 mm.

In an embodiment, a depth H2 of the second groove ranges from 0.5 mm to 1.5 mm, and a radial width W of the second groove ranges from 0.5 mm to 3 mm.

In an embodiment, a radial end surface of the edge portion is spaced from a side surface of the ring riveting portion.

In an embodiment, a radial length A of the edge portion ranges from 0.5 mm to 3 mm.

In an embodiment, the seal assembly further includes a glue filling layer, where the glue filling layer is partially covered on the sealing element and the ring riveting portion, and partially filled in the first groove.

In an embodiment, the seal assembly further includes a glue filling layer, where the glue filling layer is partially covered on the sealing element and the ring riveting portion, and partially filled in the first groove; an avoidance gap is defined between the side surface of the boss portion and the ring riveting portion, and the glue filling layer is partially filled in the avoidance gap. A battery is provided in the present application, which can simplify a sealing process and ensure a sealing performance.

In a second aspect, a battery is provided in embodiments of the present application, including any one of the above-mentioned sealing assemblies.

Beneficial effects according to the present application:
the sealing assembly is provided in the present application, including the sealing element and the top cover. The sealing element includes the connection portion and the sealing portion axially connected to each other, where the connection portion is disposed protruding from the sealing portion along the radial direction. The top cover is provided with the first groove, where the liquid injection hole is provided at the bottom of the first groove, the ring riveting portion is disposed protruding from the periphery of the first groove, the sealing portion is inserted into the liquid injection hole in an interference fit, and the ring riveting portion is riveted to the connection portion, so that the ring riveting portion is annularly pressed on the top surface of the connection portion. The above-mentioned rivet-sealing manner can greatly simplify the sealing process and ensure the sealing performance.

A battery is further provided in the present application, including the above-mentioned sealing assembly. The battery can greatly simplify a sealing process and ensure a sealing performance.

Figure 1:
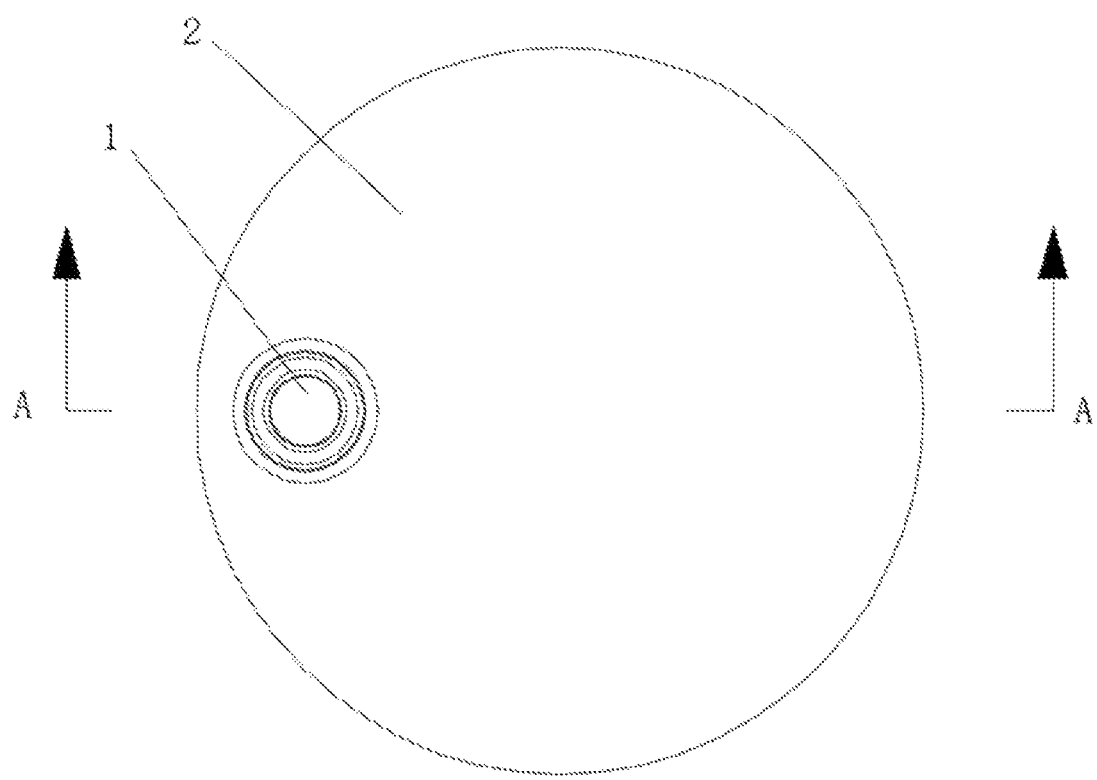
FIG. 1 is a schematic structural diagram of a sealing assembly provided in an embodiment of the present application.

REFERENCE NUMERALS 1, sealing element; 11, connection portion; 111, boss portion; 112, edge portion; 12, sealing portion;
2, top cover; 21, first groove; 22, liquid injection hole; 23, second groove; 24, ring riveting portion;
3, sealing ring;
4, glue filling layer;
100, avoidance clearance; 200, avoidance space.

DETAILED DESCRIPTION OF THE EMBODIMENT

In the description of the present application, unless otherwise specified and limited, the terms "fix", "link" or "connect" are to be construed in a broad sense, for example, as fixedly connected, detachably connected, or integrated; mechanically connected or electrically connected; directly connected to each other or indirectly connected to each other via an intermediary; or internally connected between two elements or interacted between two elements. Meanings of the preceding terms in the present application may be understood according to situations by an ordinary person in the art.

In the present application, unless otherwise specified and limited, when a first feature is described as "on" or "below" a second feature, the first feature and the second feature may be in direct contact, or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature, or the first feature is obliquely under, below or underneath the second feature, or the first feature is simply at a lower level than the second feature.

Figure 2:
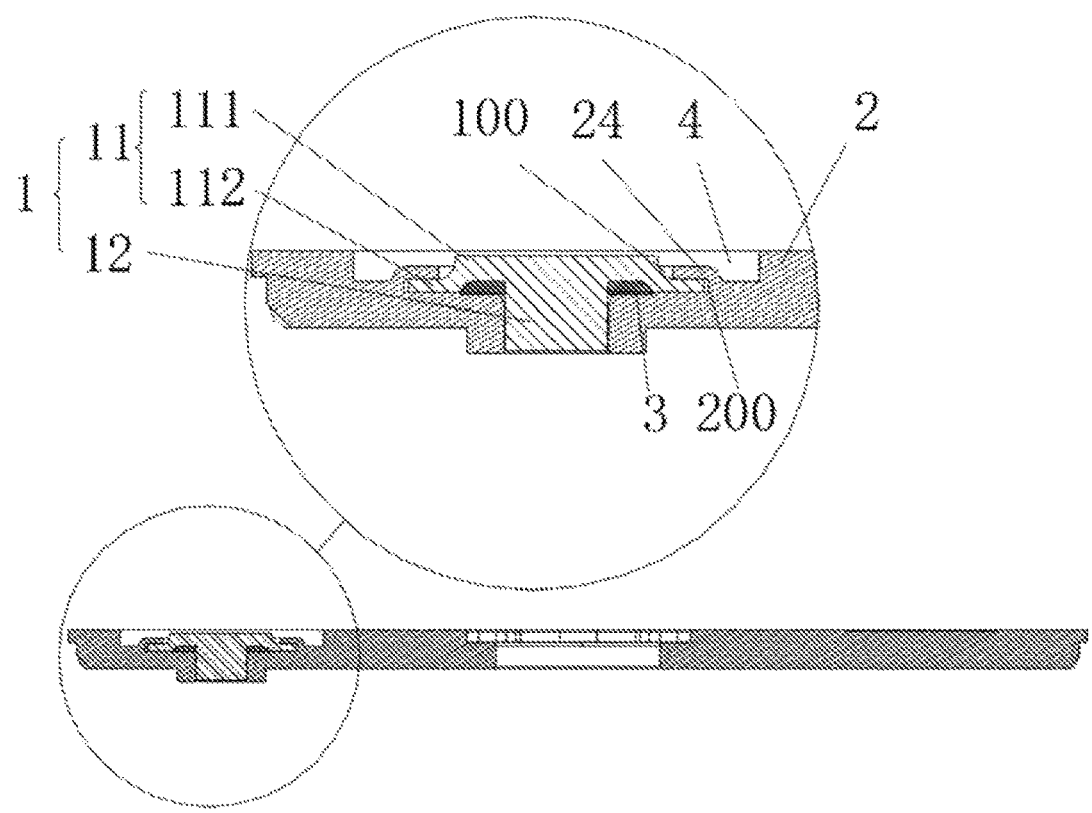
FIG. 2 is a sectional view of FIG. 1 taken along A-A.
Figure 3:
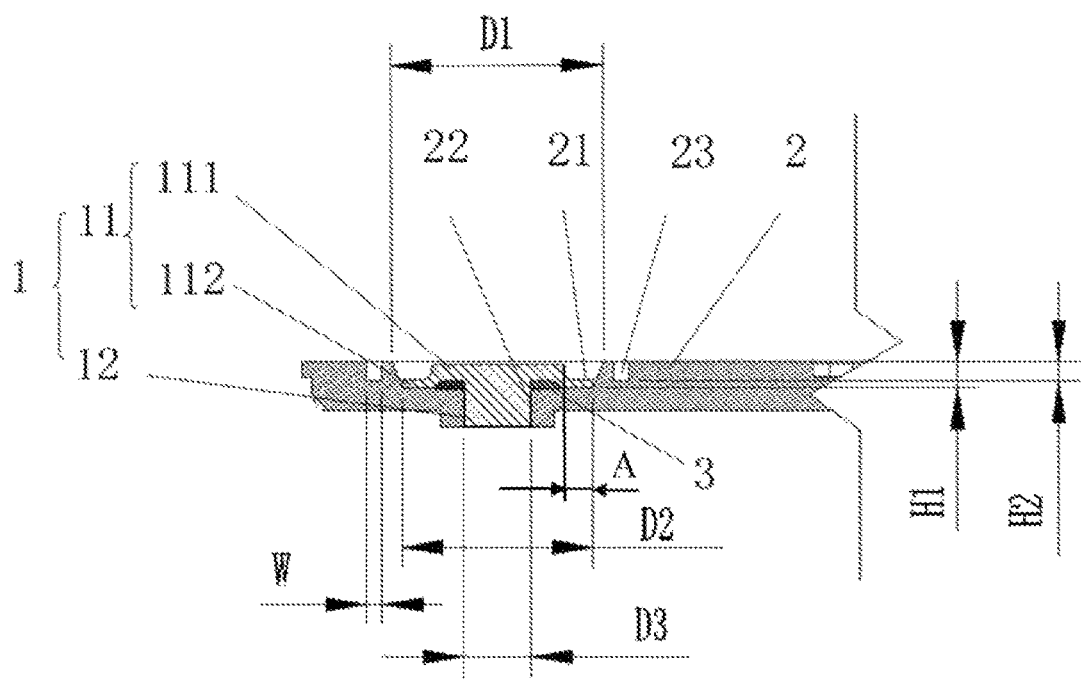
FIG. 3 is a partial sectional view of a sealing assembly provided in the embodiment of the present application before it is riveted.

A sealing assembly is provided in an embodiment, as shown in FIG. 1 to FIG. 3. The sealing assembly includes a sealing element 1 and a top cover 2. The sealing element 1 includes a connection portion 11 and a sealing portion 12 axially connected to each other, where the connection portion 11 is disposed protruding from the sealing portion 12 along a radial direction. The top cover 2 is provided with a first groove 21, where a liquid injection hole 22 is provided at a bottom of the first groove 21, and a ring riveting portion 24 is disposed protruding from a periphery of the first groove 21. The sealing portion 12 is inserted into the liquid injection hole 22 in an interference fit to define a first sealing. The ring riveting portion 24 is riveted to the connection portion 11, so that the ring riveting portion 24 is annularly pressed on a top surface of the connection portion 11. That is, a second sealing can be implemented between the ring riveting portion 24 and the connection portion 11. The above-mentioned rivet-sealing manner can greatly simplify a sealing process and ensure a sealing performance. Compared with a battery sealed with the glue particles and the sealing nails, the sealing performance of the battery utilizing the above-mentioned sealing assembly can be accurately judged in a sealing test.

In an embodiment, the top cover 2 is circular to be suitable for cylindrical batteries. In the embodiment, both the connection portion 11 and the sealing portion 12 have a circular cross-section.

In an embodiment, the top cover 2 is further provided with a second groove 23 to facilitate a formation of the ring riveting portion 24, where the second groove 23 is annularly defined at the periphery of the first groove 21 at intervals, the ring riveting portion 24 is disposed between the first groove 21 and the second groove 23, and the ring riveting portion 24 is an annular protrusion portion between the first groove 21 and the second groove 23. In the embodiment, the first groove 21 is a circular groove, the second groove 23 is a toroidal groove, and the ring rivet portion 24 is a toroidal protrusion.

In an embodiment, the connection portion 11 includes a boss portion 111 and an edge portion 112, where the edge portion 112 is annularly disposed on a side surface of the boss portion 111, and the ring riveting portion 24 is annularly pressed on the edge portion 112. In an embodiment, a radial length A of the edge portion 112 ranges from 0.5 mm to 3 mm, that is, the radial length A is a horizontal distance from the side surface of the boss portion 111 to a side surface of the edge portion 112. Riveting strength will be affected if the A is too small, and riveting difficulty will be increased if the A is too large, so the A is defined to be within the above-mentioned range. In an embodiment, a radial end surface of the edge portion 112 is spaced from a side surface of the ring riveting portion 24, that is, an annular avoidance space 200 is defined to prevent a too long length of the edge portion 112 from affecting a riveting pressure of the ring riveting portion 24.

In an embodiment, the sealing assembly further includes a sealing ring 3 to improve the sealing performance. The sealing ring 3 is sleeved on the sealing portion 12 and abutted against the bottom of the first groove 21. An upper side surface of the sealing ring 3 is abutted against a bottom surface of the boss portion 111, and a lower side surface of the sealing ring 3 is abutted against the bottom of the first groove 21, that is a third sealing can be implemented.

As shown in FIG. 3, in an embodiment, a side wall of the first groove 21 is obliquely disposed before the ring riveting portion 24 is riveted, so that a width of a notch of the first groove 21 is greater than a width of the bottom of the first groove 21. In an embodiment, the first groove 21 is a circular groove, and a diameter D1 of the notch of the first groove 21 ranges from 3 mm to 10 mm, and a diameter D2 of the bottom of the first groove 21 ranges from 2 mm to 9 mm.

In an embodiment, a depth H1 of the first groove 21 ranges from 0.5 mm to 1 mm. In an embodiment, a depth H2 of the second groove 23 ranges from 0.5 mm to 1.5 mm. In an embodiment, a radial width W of the second groove 23 ranges from 0.5 mm to 3 mm to facilitate a riveting operation.

In an embodiment, a diameter D3 of the liquid injection hole 22 ranges from 1.5 mm to 5 mm to facilitate liquid injection and sealing operations.

The sealing assembly further includes a glue filling layer 4 to ensure the sealing performance of the sealing assembly. The glue filling layer 4 is partially covered on the sealing element 1 and the ring riveting portion 24, and partially filled in the first groove 21. In an embodiment, an avoidance gap 100 is defined between the side surface of the boss portion 111 and the ring riveting portion 24 to prevent the boss portion 111 from hindering the riveting pressure of the ring riveting portion 24, and the glue filling layer 4 is partially filled in the avoidance gap 100.

Another embodiment of the present application further provides a battery, including the above-mentioned sealing assembly. The battery can simplify a sealing process and ensure a sealing performance.

What is claimed is:

1. A sealing assembly, comprising:
   a sealing element, the sealing element comprising a connection portion and a sealing portion axially connected to each other, wherein the connection portion is disposed protruding from the sealing portion along a radial direction; and
   a top cover, the top cover being provided with a first groove, wherein a liquid injection hole is provided at a bottom of the first groove, a ring riveting portion is disposed protruding from a periphery of the first groove, the sealing portion is inserted into the liquid injection hole in an interference fit, and the ring riveting portion is riveted to the connection portion, so that the ring riveting portion is annularly pressed on a top surface of the connection portion.

2. The sealing assembly of claim 1, wherein the top cover is further provided with a second groove, wherein the second groove is annularly defined at the periphery of the first groove at intervals, and the ring riveting portion is disposed between the first groove and the second groove.

3. The sealing assembly of claim 2, wherein a depth H2 of the second groove ranges from 0.5 mm to 1.5 mm, and a radial width W of the second groove ranges from 0.5 mm to 3 mm.

4. The sealing assembly of claim 1, wherein the connection portion comprises a boss portion and an edge portion, wherein the edge portion is annularly disposed on a side surface of the boss portion, and the ring riveting portion is annularly pressed on the edge portion.

5. The sealing assembly of claim 4, wherein a radial end surface of the edge portion is spaced from a side surface of the ring riveting portion.

6. The sealing assembly of claim 4, wherein a radial length A of the edge portion ranges from 0.5 mm to 3 mm.

7. The sealing assembly of claim 4, further comprising a glue filling layer, wherein the glue filling layer is partially covered on the sealing element and the ring riveting portion, and partially filled in the first groove; an avoidance gap is defined between the side surface of the boss portion and the ring riveting portion, and the glue filling layer is partially filled in the avoidance gap.

8. The sealing assembly of claim 1, further comprising a sealing ring, wherein the sealing ring is sleeved on the sealing portion and abutted against the bottom of the first groove.

9. The sealing assembly of claim 1, wherein a side wall of the first groove is obliquely disposed before the ring riveting portion is riveted, so that a width of a notch of the first groove is greater than a width of the bottom of the first groove.

10. The sealing assembly of claim 9, wherein the first groove is a circular groove, a diameter D1 of the notch of the first groove ranges from 3 mm to 10 mm, and a diameter D2 of the bottom of the first groove ranges from 2 mm to 9 mm.

11. The sealing assembly of claim 1, wherein a depth H1 of the first groove ranges from 0.5 mm to 1 mm.

12. The sealing assembly of claim 1, further comprising a glue filling layer, wherein the glue filling layer is partially covered on the sealing element and the ring riveting portion, and partially filled in the first groove.

13. The sealing assembly of claim 1, wherein the top cover is further provided with a second groove, the second groove is annularly defined at the periphery of the first groove at intervals, and the ring riveting portion is disposed between the first groove and the second groove; and
   a side wall of the first groove is obliquely disposed before the ring riveting portion is riveted, so that a width of a notch of the first groove is greater than a width of the bottom of the first groove.

14. The sealing assembly of claim 1, wherein the connection portion comprises a boss portion and an edge portion, the edge portion is annularly disposed on a side surface of the boss portion, and the ring riveting portion is annularly pressed on the edge portion; and
   a side wall of the first groove is obliquely disposed before the ring riveting portion is riveted, so that a width of a notch of the first groove is greater than a width of the bottom of the first groove.

15. The sealing assembly of claim 1, further comprising a sealing ring, wherein the sealing ring is sleeved on the sealing portion and abutted against the bottom of the first groove; and
   a side wall of the first groove is obliquely disposed before the ring riveting portion is riveted, so that a width of a notch of the first groove is greater than a width of the bottom of the first groove.

16. The sealing assembly of claim 1, wherein the top cover is further provided with a second groove, the second groove is annularly defined at the periphery of the first groove at intervals, and the ring riveting portion is disposed between the first groove and the second groove;
   a depth H1 of the first groove ranges from 0.5 mm to 1 mm.

17. The sealing assembly of claim 1, wherein the top cover is further provided with a second groove, the second groove is annularly defined at the periphery of the first groove at intervals, and the ring riveting portion is disposed between the first groove and the second groove; and
   the sealing assembly further comprises a glue filling layer, wherein the glue filling layer is partially covered on the sealing element and the ring riveting portion, and partially filled in the first groove.

18. The sealing assembly of claim 1, wherein the connection portion comprises a boss portion and an edge portion, the edge portion is annularly disposed on a side surface of the boss portion, and the ring riveting portion is annularly pressed on the edge portion;
   the sealing assembly further comprises a glue filling layer, wherein the glue filling layer is partially covered on the sealing element and the ring riveting portion, and partially filled in the first groove.

19. The sealing assembly of claim 1, further comprising a sealing ring and a glue filling layer, wherein the sealing ring is sleeved on the sealing portion and abutted against the bottom of the first groove, the glue filling layer is partially covered on the sealing element and the ring riveting portion, and partially filled in the first groove.

20. A battery, comprising a sealing assembly, wherein the sealing assembly comprises:
   a sealing element, the sealing element comprising a connection portion and a sealing portion axially connected to each other, wherein the connection portion is disposed protruding from the sealing portion along a radial direction; and a top cover, the top cover being provided with a first groove, wherein a liquid injection hole is provided at a bottom of the first groove, a ring riveting portion is disposed protruding from a periphery of the first groove, the sealing portion is inserted into the liquid injection hole in an interference fit, and the ring riveting portion is riveted to the connection portion, so that the ring riveting portion is annularly pressed on a top surface of the connection portion.

\* \* \* \* \*